United States Patent

Maejima

[11] 4,062,499
[45] Dec. 13, 1977

[54] ELECTRICAL GRINDING MACHINE FOR COFFEE BEANS

[75] Inventor: Husazo Maejima, Tokyo, Japan

[73] Assignee: Philmac Denki Kabushiki Kaisha, Tokyo, Japan

[21] Appl. No.: 733,943

[22] Filed: Oct. 19, 1976

[30] Foreign Application Priority Data

Oct. 23, 1975 Japan .............................. 50-143636[U]

[51] Int. Cl.² .............................................. B02C 7/14
[52] U.S. Cl. .................................. 241/259; 241/259.1
[58] Field of Search ................... 241/244, 248, 257 R, 241/259, 259.1

[56] References Cited

U.S. PATENT DOCUMENTS

| 2,019,013 | 10/1935 | Kopf et al. | 241/259.1 X |
| 2,852,203 | 9/1958 | Ditting et al. | 241/259 |
| 2,955,768 | 10/1960 | Engi | 241/259 X |
| 3,688,996 | 9/1972 | Kuest | 241/259.1 X |
| 3,880,367 | 4/1975 | Grover | 241/248 |

Primary Examiner—Joseph H. McGlynn
Assistant Examiner—Howard N. Goldberg

[57] ABSTRACT

An electric grinding machine for coffee beans comprising a grinding chamber formed within a casing and containing a rotary mill body driven by an electric motor and a non-rotatable mill body opposite the rotary body and displaceable towards and away therefrom. The non-rotatable body is connected to an adjustment member mounted outside the casing such that the spacing between the mill bodies can be regulated by the adjustment member.

3 Claims, 2 Drawing Figures

ELECTRICAL GRINDING MACHINE FOR COFFEE BEANS

FIELD OF THE INVENTION

This invention relates to an electric grinding machine for coffee beans.

BACKGROUND

It has been conventional for the grinding of coffee beans to use, for example, a mixer such as a rotary blade attached to a vertical shaft within a bowl. It is difficult in this case to adjust the grinding degree of the coffee beans. Additionally, it is disadvantageous in that, because of the rotary blade, there is the danger that an operator can injure his hand when carelessly contacting the blade.

SUMMARY OF THE INVENTION

An object of the present invention is to provide an electric grinding machine for coffee beans which avoids the above disadvantages.

A further object of the invention is to provide an electric grinding machine in which a rotary blade is not employed.

Yet another object of the invention is to provide an electric grinding machine in which the degree of grinding of the coffee beans is readily adjusted from outside the grinding machine.

In accordance with the invention, there is provided a grinding machine for coffee beans comprising a casing, a grinding chamber in said casing, a rotary mill body, means for driving said rotary body in rotation, a non-rotatable mill body opposed to said rotary mill body, means for displacing said non-rotatable mill body for advancement and retraction with respect to said rotary mill body to adjust the spacing therebetween, and an adjustment member external of said casing coupled to said means for displacing the non-rotatable mill body to adjust the position of said non-rotatable mill body with respect to said rotary body.

In further accordance with the invention, the non-rotatable body is supported for longitudinal displacement in the casing and the means for displacing the non-rotatable body comprises a rotatable threaded member threadably engaged with the non-rotatable body and externally actuated by the adjustment member.

DETAILED DESCRIPTION

Figure 1:
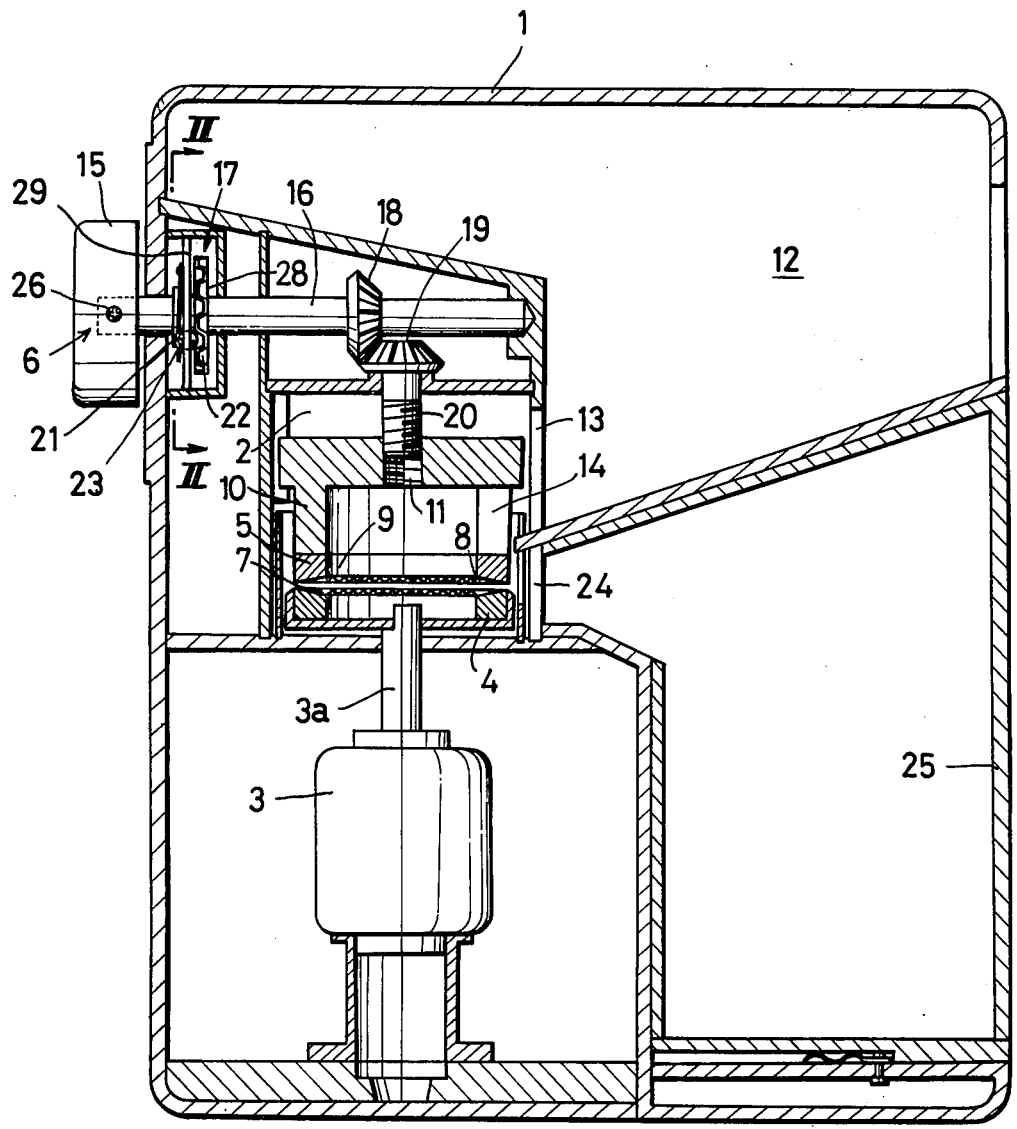
FIG. 1 is a sectional side view of one embodiment according to the invention.
Figure 2:
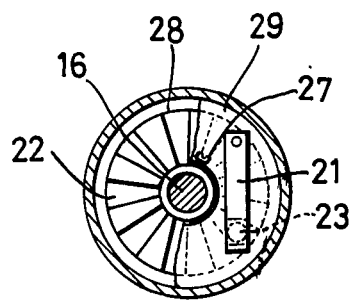
FIG. 2 is a section view taken on line II—II in FIG. 1.

Referring to the drawing therein is seen a grinding machine comprising a casing 1 having a grinding chamber 2 formed therein. An electric motor 3 drives a rotary mill body 4 in chamber 2. A non-rotatable mill body 5 is opposed to body 4 and is supported for advancing and retracting movement with respect thereto. The non-rotatable mill body 5 is connected to an advancing and retracting adjustment operation member 6 disposed outside the casing 1.

The rotary mill body 4 comprises a disc connected at its center to output shaft 3a of the electric motor 3, and the body 4 is provided at its peripheral edge portion, opposite the non-rotatable mill body 5, with a plurality of radial ridges 7.

The non-rotatable mill body comprises an annular body having radial ridges 8 facing the radial ridges 7 of the rotary mill body 4 and the annular body has in its center portion a coffee bean supply open 9. A tubular body 10, closed at one end, is attached to said annular body and its interior is in communication with the supply opening 9. The body 10 has a lip which rides in a longitudinal groove in chamber 2 such that the body 10 is non-rotatable and is only longitudinally displaceable such that the non-rotatable mill body 5 can be moved to advance and retract along with the tubular body 10 within the grinding chamber 2. The tubular body 10 is provided with a threaded opening 11 at its closed end. A coffee bean supply chamber 12 is formed in casing 1 and has an opening 13 therein leading to a supply opening 14 formed in a side wall of tubular body 10.

The adjustment operation member 6 comprises a knob 15 secured to the front end of an operation shaft 16 by means of a screw 26. The operation shaft 16 carries a bevel gear 18 which is in mesh with a bevel gear 19 secured on a rod 20 in threaded engagement in the threaded opening 11 such that by turning the knob 15, the tubular body 10, and the non-rotatable mill body 5 therewith can be driven in advancing and retracting movements through the bevel gears 18, 19. As seen, the shaft 16 extends at right angles to rod 20.

The shaft 16 is held in angular position by a restraining device 17 which allows the shaft to be moved stepwise. The restraining device 17 comprises a disc 28 fixed to shaft 16 by screw 27, said disc having radial recesses 22 formed by appropriate bends in the disc. A resilient arm 21 is secured to a fixed support member 29 rigidly secured to the casing 1. The lower end of resilient arm 21 carries a ball which penetrates through an aperture in support member 29 and is pressed into a recess 22 in disc 28. Thus, by turning the knob 15 and shaft 16 therewith, the disc 28 is turned and the operation shaft 16 is restrained each time when the ball 23 mounts itself in one of the recesses 22 of the disc 28. Accordingly, the restraining device acts to establish index positions for the knob in accordance with the radial grooves 22.

Numeral 24 denotes a discharge opening for ground coffee beans at a low portion of the grinding chamber 2, and numeral 25 denotes a receiving container for the discharged coffee powder, the receiving container 25 being mounted in the casing 1 so as to be removable therefrom.

In accordance with the invention, the non-rotatable mill body 5 can be given any desired advanced or retracted movement by adjusting the adjustment operation member 6 and thereby the gap between the body 5 and the rotary mill body 4 can be adjusted, whereby any desired size of coffee powder can be obtained Moreover, since there is not rotary blade, there is no danger of any injury even if a finger is carelessly inserted thereinto.

What is claimed is:

1. A grinding machine for coffee beans comprising a casing, a grinding chamber in said casing, a rotary mill body in said grinding chamber, an electric motor disposed in said casing and coupled to said rotary mill body for driving said rotary body in rotation, a non-rotatable mill body in said grinding chamber opposed to said rotary mill body, said mill bodies including ridges thereon facing one another, said non-rotatable body being supported for longitudinal displacement in said casing, said mill bodies being annular and defining an interior chamber, one of said bodies having an inlet opening for admission of coffee beans to be ground into said interior chamber, a supply chamber in said casing for coffee beans, means establishing communication between said supply chamber and said interior chamber, means for displacing said non-rotatable mill body for advancement and retraction with respect to said rotary mill body to adjust the spacing therebetween, an adjustment member including a rotatable knob external of said casing coupled to said means for displacing the non-rotatable mill body to adjust the position of said non-rotatable mill body with respect to said rotary mill body, and a receiving container removably coupled to said casing and having an inlet facing an outlet provided in said grinding chamber to receive ground coffee from said mill bodies, said means for displacing said non-rotatable mill body comprising a rotatable threaded member threadably engaged with said non-rotatable mill body, an operation shaft coupled to said knob, gear means coupling said threaded member and said operation shaft, and restraining means acting on said adjustment member for establishing index positions therefore for holding the non-rotatable mill body in adjusted spaced position relative to the rotary mill body, said threaded member and operation shaft extending perpendicularly to one another, said gear means comprising bevel gears respectively on said operation member and said threaded member and in mesh with one another.

2. A machine as claimed in claim 1 wherein said restraining means comprises a disc fixed to said shaft and having radial recesses in said disc, and a resilient member including means releasably engagable with said recesses in said disc.

3. A machine as claimed in claim 2 comprising a support member fixed to said casing and supporting said resilient member, said means releasably engageable with the recesses in said disc comprising a ball carried by said resilient member and engageable in one of said recesses.

* * * * *